(12) United States Patent
Lee et al.

(10) Patent No.: US 7,835,310 B2
(45) Date of Patent: Nov. 16, 2010

(54) METHOD AND SYSTEM FOR TRANSMITTING AND RECEIVING A SIGNAL IN A WIRELESS LOCAL AREA NETWORK

(75) Inventors: Sung-Won Lee, Seoul (KR); Jun-Seo Lee, Seoul (KR); Rakesh Taori, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 668 days.

(21) Appl. No.: 11/432,385

(22) Filed: May 12, 2006

(65) Prior Publication Data

US 2006/0256743 A1   Nov. 16, 2006

Related U.S. Application Data

(60) Provisional application No. 60/680,510, filed on May 13, 2005, provisional application No. 60/680,511, filed on May 13, 2005.

(30) Foreign Application Priority Data

Apr. 17, 2006   (KR) ...................... 10-2006-0034721

(51) Int. Cl.
*H04B 7/005*   (2006.01)
*H04L 12/413*   (2006.01)

(52) U.S. Cl. ...................................... 370/278; 370/447
(58) Field of Classification Search ................. 370/278, 370/447, 329, 328, 446, 334, 336–339, 443, 370/462
See application file for complete search history.

(56) References Cited

U.S. PATENT DOCUMENTS

| | | | |
|---|---|---|---|
| 7,305,004 B2 * | 12/2007 | Sherman | 370/462 |
| 2003/0185166 A1 * | 10/2003 | Belcea | 370/321 |
| 2004/0196813 A1 * | 10/2004 | Ofek et al. | 370/334 |
| 2005/0190784 A1 * | 9/2005 | Stine | 370/445 |
| 2006/0109804 A1 * | 5/2006 | Wang et al. | 370/278 |

* cited by examiner

*Primary Examiner*—Melody Mehrpour
(74) *Attorney, Agent, or Firm*—NSIP Law

(57) ABSTRACT

A method and system for transmitting and receiving a signal between first and second mobile nodes is provided. The method and system offers improvements to the throughput of an overall wireless local area network. When the first mobile node receives a data frame from the second mobile node, third mobile nodes can also transmit and receive the data frame. The first mobile node sends an acknowledgement (ACK) frame for notifying that the data frame has been completely received to the second mobile node through a common channel.

6 Claims, 6 Drawing Sheets

METHOD AND SYSTEM FOR TRANSMITTING AND RECEIVING A SIGNAL IN A WIRELESS LOCAL AREA NETWORK

CROSS-REFERENCE TO RELATED APPLICATIONS

This application claims the benefit under 35 U.S.C. §119 to three applications Ser. Nos. 60/680,510 and 60/680,511, filed in the United States Patent and Trademark Office on May 13, 2005 and Ser. No. 2006-34721, filed in the Korean Intellectual Property Office on Apr. 17, 2006, the entire disclosures of all three of which are hereby incorporated by reference.

BACKGROUND OF THE INVENTION

1. Field of the Invention

The present invention generally relates to a wireless Local Area Network (LAN). More particularly, the present invention relates to a method for efficiently transmitting and receiving a signal in a wireless LAN.

2. Description of the Related Art

Conventionally, a wireless signal transmission distance is limited in a wireless Local Area Network (LAN). To overcome this limitation, a multi-hop scheme is used for communication with a base station or other mobile nodes outside a wireless transmission range of a mobile node. A typical communication system using the multi-hop scheme is a wireless mesh network. In the wireless mesh network, mobile nodes serve as main bodies for data communication. The wireless mesh network is a communication system for relaying and routing a received signal from one mobile node to another within the same network.

The wireless mesh network can be easily extended in a region where it is difficult for a wired network to be installed, and has a reliable structure because each mobile node can be directly coupled to neighboring mobile nodes.

Accordingly, there is a need for an improved system and method for reducing cycle time by transmitting an acknowledgement (ACK) frame through a common channel in a wireless local area network.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to efficiently transmit and receive a signal in a wireless local area network. It is, therefore, an object of exemplary embodiments of the present invention to provide a method and a system that can reduce a cycle time by transmitting an acknowledgement (ACK) frame through a common channel in a wireless local area network.

It is another object of exemplary embodiments of the present invention to provide a method and a system that can reduce a cycle time by transmitting and receiving a Request To Send (RTS) frame and a Clear To Send (CTS) frame using a common channel in a wireless Local area network.

It is yet another object of an exemplary embodiment of the present invention to provide a method and a system that can simultaneously transmit Request To Send (RTS) frames by including a particular time value in an acknowledgement (ACK) frame and relaying the ACK frame to neighbor mobile nodes in a wireless local area network.

In accordance with an aspect of an exemplary embodiment of the present invention, there is provided a method and a system for transmitting and receiving a signal between a first mobile node and a second mobile node in a wireless local area network, where a data frame from the second mobile node is received by the first mobile node, and an acknowledgement (ACK) frame is sent to the second mobile node which notifies that the first mobile node has completely received the data frame through a common channel.

In accordance with another aspect of an exemplary embodiment of the present invention, there is provided a method and system for transmitting and receiving a signal between mobile nodes in a wireless local area network, where an acknowledgement (ACK) frame is received by a first mobile node which notifies that a data frame has been completely received from a second mobile node, information about a next data frame transmission time is included in the ACK frame, and the ACK frame is sent with the information from the first mobile node to a third mobile node.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well known functions and constructions are omitted for clarity and conciseness.

An exemplary embodiment of the present invention proposes a method and system for transmitting and receiving a signal using a common channel in a wireless Local Area Network (LAN). According to a first exemplary embodiment of the present invention, a mobile node receives an acknowledgement (ACK) frame through a common channel from an opposite mobile node after completing a data frame transmission. In a second exemplary embodiment of the present invention, Request To Send (RTS) frames are simultaneously sent by relaying a new ACK frame to neighbor mobile nodes.

Figure 1A:
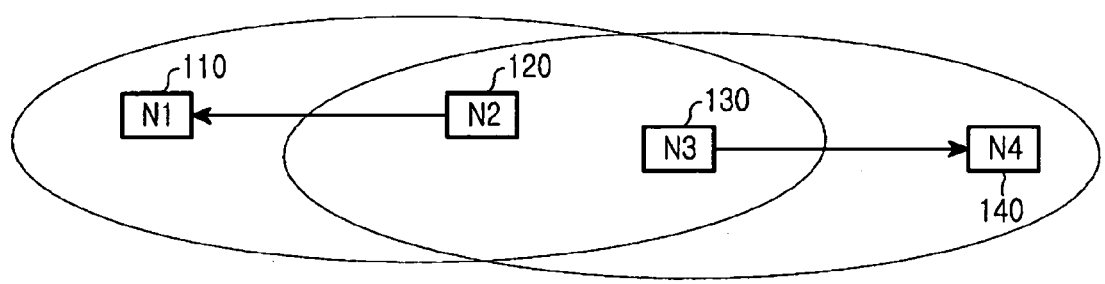
FIGS. 1A and 1B illustrate a signal transmission and reception scheme in a wireless Local Area Network (LAN)
Figure 1B:
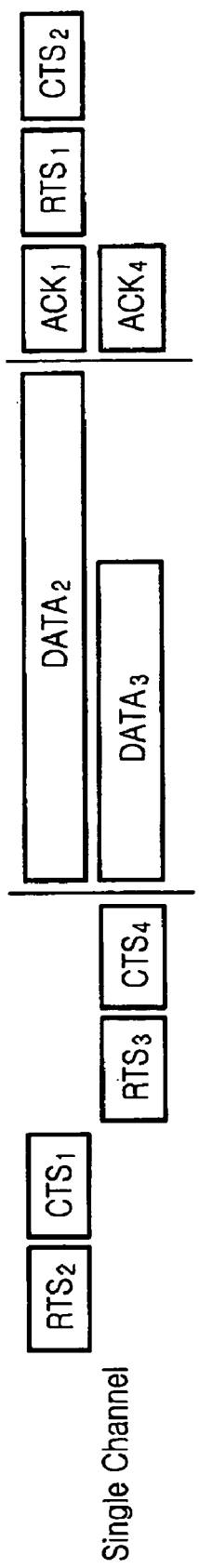

FIGS. 1A and 1B illustrate a signal transmission and reception scheme in the wireless LAN.

Referring to FIGS. 1A, the wireless LAN (for example, a mesh network) includes a first mobile node (N1) 110, a second mobile node (N2) 120, a third mobile node (N3) 130, and a fourth mobile node (N4) 140. The mobile nodes 110, 120, 130, and 140 can transmit and receive a signal in their communication areas.

A signal transmission and reception procedure of N1 110, N2 120, N3 130, and N4 140 is referred to as a 4-way handshake. The 4-way handshake procedure indicates a procedure for transmitting and receiving RTS, (CTS), data, and ACK frames. The formats of the RTS, CTS, data, and ACK frames are disclosed in the Institute of Electrical and Electronics Engineers (IEEE) 802.11 Wireless LAN standard.

Referring to FIG. 1B, N2 120 sends an RTS frame (or message) to N1 110 at the earliest time. An YYY frame sent from Nx is referred to as "YYYx". That is, when N2 120 sends an RTS2 frame to a destination address of N1 110 through a single channel, N1 110 receives the RTS2 frame. N3 130 and N1 110 receive the RTS2 frame of N2 120. N3 130 does not send any signal to prevent a collision. Subsequently, N2 120 receives a CTS1 frame from N1 110.

After N2 120 sends the RTS2 frame, N3 130 sends an RTS3 frame to N4 140 and then receives a CTS4 frame from N4 140.

In an exemplary implementation, N2 120 and N3 130 send DATA2 and DATA3 frames to N1 110 and N4 140 at a synchronization time, respectively when the CTS frames are received. However, because a length of the DATA2 frame is longer than that of the DATA3 frame as illustrated in FIG. 1B, N3 130 can receive an ACK4 frame after N2 120 completely sends the DATA2 frame. That is, when the 4-way handshake procedure is performed through the single channel, the N3 130 receives the ACK4 frame to perform synchronization after the data frame of N2 120 is completely sent. This means that the time resources of N3 130 are wasted until the data frame is completely sent.

Figure 2:
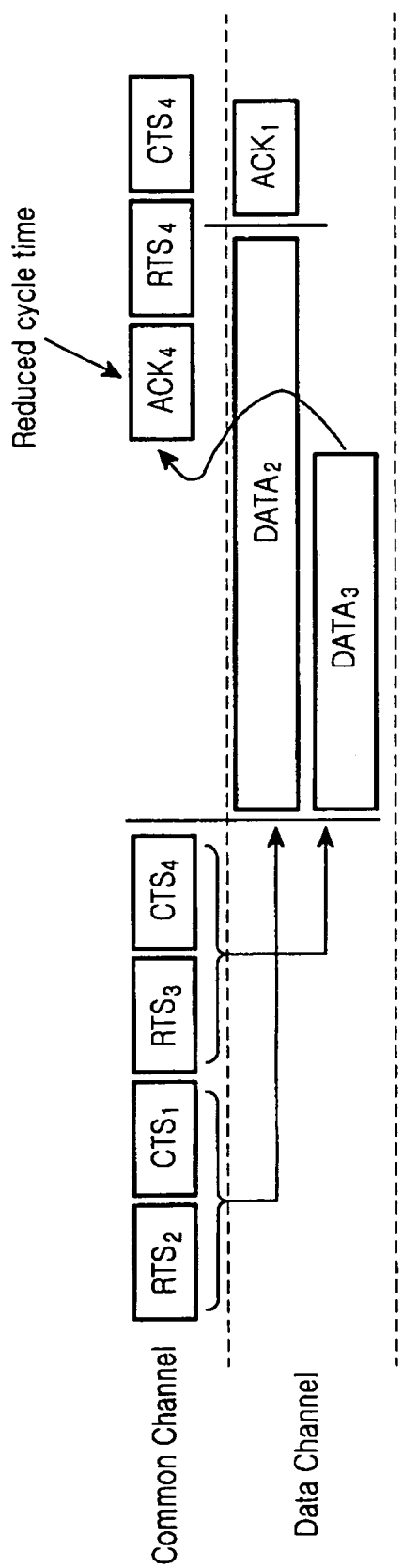
FIG. 2 illustrates a 4-way handshake process in accordance with a first exemplary embodiment of the present invention.

FIG. 2 illustrates a 4-way handshake process in accordance with the first exemplary embodiment of the present invention.

The 4-way handshake process of FIG. 2 will be described with reference to the wireless mesh network structure of FIG. 1A.

Mobile nodes can transmit and receive RTS, CTS, and ACK frames through a common channel. A data frame can be transmitted and received only through a data channel.

Upon receiving a CTS4 frame from N4 140 in FIG. 1A, N3 130 sends a DATA3 frame to N4 140. At this time, N2 120 also sends a DATA2 frame to N1 110. As illustrated in FIG. 2 a data frame length of N3 130 is shorter than that of N2 120. In the first exemplary embodiment of the present invention, N4 140 sends an ACK4 frame through the common channel after completely receiving the DATA3 frame. Thus, the first exemplary embodiment of the present invention can prevent the waste of time resources which is common in the prior art when N3 130 cannot receive the ACK frame before the data frame of N2 120 is completely sent.

Figure 3:
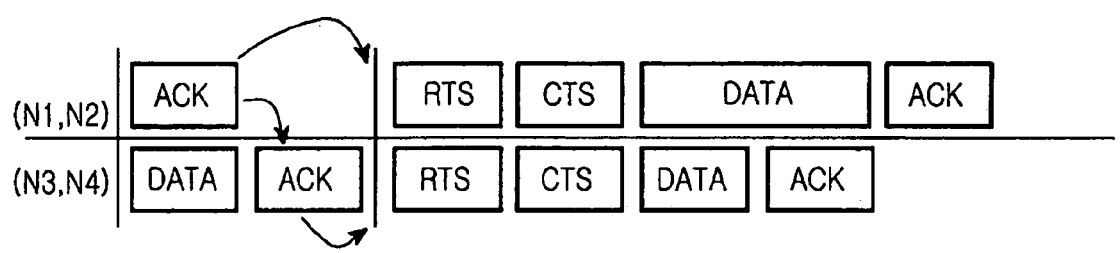
FIG. 3 illustrates a 4-way handshake process for relaying an acknowledgment (ACK) frame in accordance with a second exemplary embodiment of the present invention.

FIG. 3 illustrates a 4-way handshake process for relaying an ACK frame in accordance with the second exemplary embodiment of the present invention.

Referring to FIG. 3, a data frame transmission from N3 to N4 is in progress when N1 receives an ACK frame through a common channel from N2. N1 generates a new ACK frame by including a value indicating an RTS frame transmission time (such as, contention window information) in the received ACK frame, and sends the new ACK frame to N2, N3, and N4 through the common channel.

According to an exemplary implementation, when the new ACK frame is received, N3 or N4 sends an RTS frame at the RTS frame transmission time indicated in the ACK frame to an opposite mobile node. N1 or N2 can also send the RTS frame at the above-described transmission time. In this case, the RTS and CTS frames can also be transmitted and received through the common channel.

Figure 4A:
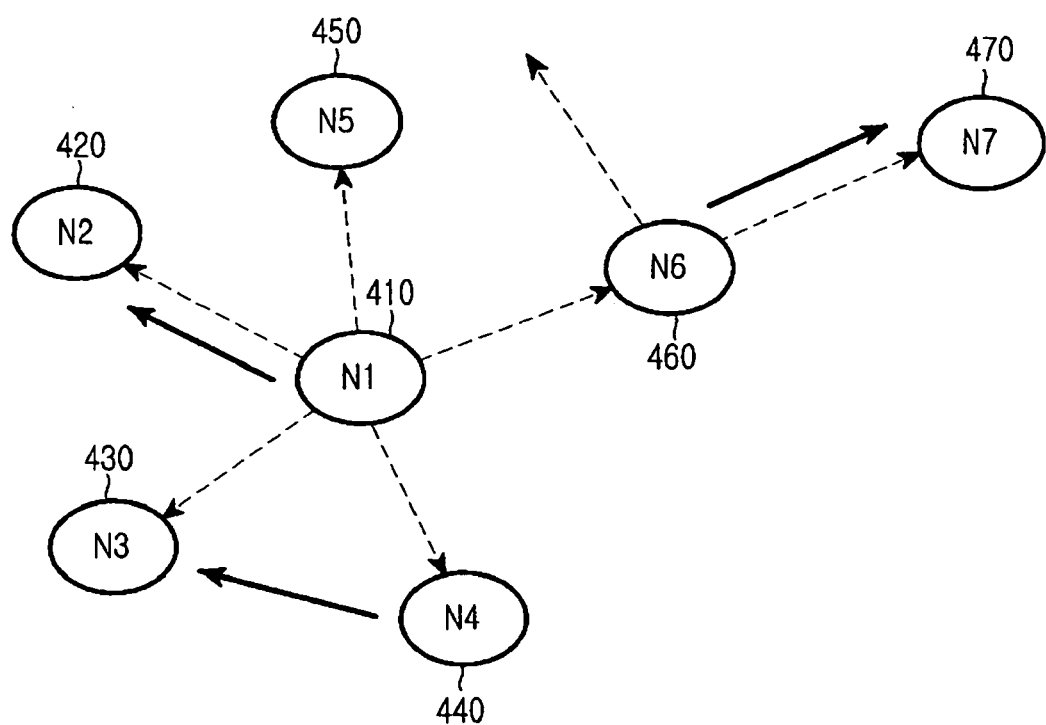
FIGS. 4A and 4B illustrate the 4-way handshake process between multiple mobile nodes in accordance with the second exemplary embodiment of the present invention.
Figure 4B:
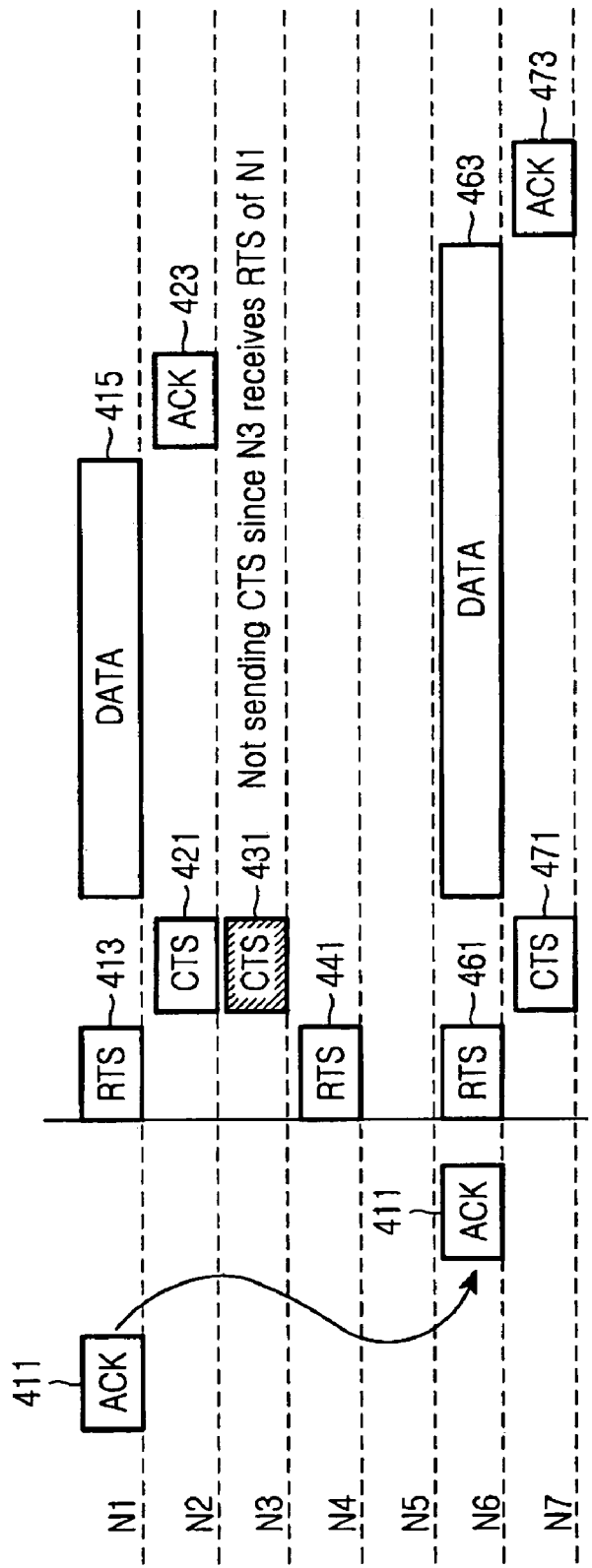

FIGS. 4A and 4B illustrate the 4-way handshake process between multiple mobile nodes in accordance with the second exemplary embodiment of the present invention.

Referring to FIGS. 4A and 4B, N1 410 includes a value indicating the next RTS frame transmission time in an ACK frame 411 received from an arbitrary mobile node, and then sends the frame to N6 460 through a common channel.

Subsequently, N1 410 sends an RTS frame 413 to a destination address of N2 420 at the transmission time. At the transmission time, N4 440 sends an RTS frame 441 to a destination address of N3 430, and N6 460 sends an RTS frame 461 to a destination address of N7 470.

According to an exemplary implementation, when the RTS frame 413 is received, N2 420 sends a CTS frame 421 to a destination address of N1 410. Upon receiving an RTS frame 461, N7 470 sends a CTS frame 471 to a destination address of N6 460. However, N3 430 cannot send a CTS frame 431 mapped to the RTS frame 441 of N4 440 because it has received the RTS frame 413 of N1 410.

Upon receiving a CTS frame 421, N1 410 sends a data frame 415 to N2 420. N6 460 also sends a data frame 463 to N7 470. Subsequently, N2 420 and N7 470 send ACK frames 423 and 473 to N1 410 and N6 460, respectively.

An exemplary embodiment of the present invention can minimize the waste of time resources by performing part of a 4-way handshake operation using a common channel in a wireless LAN, such that the data throughput of a wireless mesh network can be maximized.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting and receiving a signal between mobile nodes in a wireless local area network, the method comprising:

exchanging a Request To Send (RTS) frame and a Clear To Send (CTS) frame between a first mobile node and a second mobile node through a common channel;

receiving, by the first mobile node, a data frame from the second mobile node through a data channel;

upon completely receiving the data frame, determining, by the first mobile node, if another mobile node is transmitting data through the data channel; and sending, to the second mobile node, an acknowledgement (ACK) frame through the common channel, the ACK frame notifying that the first mobile node has completely received the data frame, wherein, if the first mobile node determines another node is transmitting data through the data channel, the sending further comprises sending the ACK frame through the common channel, and the ACK frame is sent during transmitting data of another node, without waiting for the data of another node to be completely sent.

2. The method of claim 1, wherein the first mobile node receives the RTS frame for notifying that the data frame will be sent from the second mobile node, and receives the data frame from the second mobile node after sending, to the second mobile node, the CTS frame for notifying that the first mobile node is ready to receive the data frame.

3. A method for transmitting and receiving a signal between mobile nodes in a wireless local area network, the method comprising:
- exchanging a Request To Send (RTS) frame and a Clear To Send (CTS) frame between a first mobile node and a second mobile node through a common channel;
- transmitting, by the first mobile node, a data frame to the second mobile node through a data channel;
- receiving, by the first mobile node, an acknowledgement (ACK) frame for notifying that the data frame has been completely received from the second mobile node, through the common channel; and
- including information about a next RTS transmission time in the ACK frame, and sending the ACK frame with the information from the first mobile node to a plurality of third mobile nodes via the common channel,
- wherein, upon completion of the first mobile node transmitting the data frame, if another node is transmitting data through the data channel, the receiving further comprises receiving the ACK frame through the common channel, and the ACK frame is sent during transmitting data of another node, without waiting for the data of another node to be completely sent.

4. The method of claim 3, further comprising:
- sending, from the first mobile node, a RTS frame for notifying that a data frame will be sent to neighbor mobile nodes; and
- sending, from the third mobile nodes, RTS frames for notifying that data frame will be sent to neighbor mobile nodes.

5. A system for receiving and transmitting signals between mobile nodes, the system comprising:
- a first mobile node;
- a second mobile node; and
- at least one other node,
- wherein the first and second mobile nodes are configured to exchange a Request To Send (RTS) frame and a Clear To Send (CTS) frame with each other through a common channel, the first mobile node is configured to receive a data frame from the second mobile node through a data channel, and the second mobile node is configured to receive an acknowledgement (ACK) frame through the common channel, the ACK frame notifying that the first mobile node has completely received the data frame, and
- wherein, upon completion of receiving the data frame, if the first mobile node determines that another node is transmitting data through the data channel, the first node transmits the ACK frame through the common channel, and the ACK frame is sent during transmitting data of another node, without waiting for the data of another node to be completely sent.

6. The system of claim 5, wherein the first mobile node receives the RTS frame for notifying that the data frame will be sent from the second mobile node, and receives the data frame from the second mobile node after sending, to the second mobile node, the CTS frame for notifying that the first mobile node is ready to receive the data frame.

* * * * *